United States Patent [19]

Brau et al.

[11] 4,442,522
[45] Apr. 10, 1984

[54] CIRCULAR FREE-ELECTRON LASER

[75] Inventors: Charles A. Brau, Los Alamos; Norman A. Kurnit, Santa Fe; Richard K. Cooper, Los Alamos, all of N. Mex.

[73] Assignee: The United States of America as represented by the United States Department of Energy, Washington, D.C.

[21] Appl. No.: 342,682

[22] Filed: Jan. 26, 1982

[51] Int. Cl.$^3$ ............................................. H01S 3/00
[52] U.S. Cl. ....................................................... 372/2
[58] Field of Search ............................................ 372/2

[56] References Cited

U.S. PATENT DOCUMENTS 4,287,488  9/1981  Brau et al. ................................. 372/2
4,338,570  7/1982  Kurnit ..................................... 330/4.6

OTHER PUBLICATIONS

Boscolo et al., "Free-Electron Lasers and Masers on Curved Paths"; Appl. Phys., (Germany), vol. 19, No. 1, pp. 46–51, May 1979.
Vlason et al.; "Transformation of a Whispering Gallery Mode, Propagating in a Circular Waveguide, into a Beam of Waves"; Radio Eng. and Elect. Phys., (USA), vol. 20, No. 10, pp. 14–17, Oct. 1975.

Primary Examiner—William L. Sikes
Assistant Examiner—Léon Scott, Jr.
Attorney, Agent, or Firm—Paul D. Gaetjens; Samuel M. Freund

[57] ABSTRACT

A high efficiency, free electron laser utilizing a circular relativistic electron beam accelerator and a circular whispering mode optical waveguide for guiding optical energy in a circular path in the circular relativistic electron beam accelerator such that the circular relativistic electron beam and the optical energy are spatially contiguous in a resonant condition for free electron laser operation. Both a betatron and synchrotron are disclosed for use in the present invention. A free electron laser wiggler is disposed around the circular relativistic electron beam accelerator for generating a periodic magnetic field to transform energy from the circular relativistic electron beam to optical energy.

12 Claims, 7 Drawing Figures

CIRCULAR FREE-ELECTRON LASER

BACKGROUND OF THE INVENTION

This invention is the result of a contract with the Department of Energy (Contract No. W-7405-ENG-36).

The concept of a free electron laser is attributed to J. M. J. Madey, J. Appl. Phys. 42, 1906 (1971), although a microwave analog of Madey's concept, called a ubitron, was previously conceived. The concept of trapping electrons at a resonant velocity was disclosed by N. M. Kroll, P. L. Morton, and M. N. Rosenbluth, "Enhanced Energy Extraction in Free Electron Lasers by Means of Adiabatic Decrease in a Resonant Energy," Workshop on Free Electron Generators of Coherent Radiation, Telluride, Colo., Aug. 13–17, 1979, who proposed to extract energy from the electrons by varying the wiggler magnetic field in such a way as to decelerate the buckets by reducing the resonant velocity, thereby decelerating the trapped electrons. Others, such as D. A. Reilly, M. S. Tekula, and R. M. Patrick, "Beam Heating Constraints on a Low Voltage Free Electron Laser with Visible Output," Workshop on Free Electron Generators of Coherent Radiation, Telluride, Colo., Aug. 13–17, 1979, extended this concept by applying an electrostatic field to accelerate the electrons in a uniform wiggler so that the work done on the trapped electrons is transferred to the optical field. Finally, this concept was extended to rf acceleration in a traveling wave field by a Japanese group.

All of these concepts relate to linear free electron lasers which discard the electron beam at the end of the wiggler, along with the energy possessed by the electrons. Various proposals have been advanced for recovering part of the energy of the electrons before these electrons are discarded, such as disclosed by L. R. Elias, Phys. Rev. Lett. 42, 977 (1979); C. A. Brau, T. J. Boyd, R. K. Cooper, and D. A. Swenson, "High Efficiency Free Electron Laser Systems," International Conference on Lasers, Orlando, Fla., Dec. 17–21, 1979; U.S. Pat. No. 4,287,488 issued Sept. 1, 1981 entitled "RF Feedback Free Electron Laser;" U.S. patent application Ser. No. 102,804, filed Dec. 12, 1979 entitled "Catalac Free Electron Laser; and now U.S. Pat. No. 4,323,857 "U.S. patent application Ser. No. 233,530, filed Feb. 11, 1981, entitled "Single Electron Beam RF Feedback Free Electron Laser;" U.S. patent application Ser. No. 275,478, filed June 19, 1981, entitled "Free Electron Laser Using RF Coupled Accelerating and Decelerating Structures;" and D. Prosnitz, A. Szoke, and V. K. Neil, "One Dimensional Computer Simulation of a Variable Parameter Free Electron Laser," Workshop on Free Electron Generators of Coherent Radiation, Telluride, Colo., Aug. 13–17, 1979. These inventions should increase overall system efficiency.

The first concept to reuse the electrons themselves, thereby recovering all of the energy of the electrons, was put forward by T. J. Smith, J. M. J. Madey, L. R. Elias, and D. A. G. Deacon, J. Appl. Phys. 50, 4580 (1979). They suggested that a storage ring be used to reaccelerate the electrons emerging from the free electron laser, to replace the energy converted to optical radiation, and then to bring the electrons around for reinsertion into the wiggler. The difficulty with such an approach is that when the electrons are released from the ponderomotive field, they possess an energy spread which may exceed the energy extracted as laser radiation. As the electron recirculate around the ring, they spread longitudinally and develop a distribution in energy and space which is unacceptable for free electron laser operation. To avoid this problem, D. A. G. Deacon, Stanford University report HEPL-854 (1979), proposed use of an isochronous storage ring in which the longitudinal spread can be avoided. However, the problems of building an isochronous ring to the required precision are formidable.

SUMMARY OF THE INVENTION

It is therefore an object of the present invention to provide an improved free electron laser.

It is also an object of the present invention to provide a high power free electron laser.

Another object of the present invention is to provide a high power, high efficiency free electron laser.

Another object of the present invention is to provide a circular free electron laser having high efficiency.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise a high power, high efficiency free electron laser comprising: circular relativistic electron beam accelerator means for producing a circular relativistic electron beam; free electron laser wiggler means disposed in said circular relativistic electron beam accelerator for generating a periodic magnetic field to transform energy from said circular relativistic electron beam to optical energy; circular whispering mode optical waveguide means for guiding said optical energy in a circular path in said circular relativistic electron beam accelerator such that said circular relativistic electron beam and said optical energy are spatially contiguous in a resonant condition for free electron laser operation.

The present invention may also comprise, in accordance with its objects and purposes, a circular free electron laser having high efficiency comprising: means for generating a substantially circular relativistic electron beam; means for producing an acceleration field; free electron laser wiggler means disposed around said circular relativistic electron beam for producing a spatially periodic magnetic field such that an optical field is generated in response to the transformation of energy from said acceleration field to said optical field; whispering mode optical waveguide means disposed to guide said optical field in a substantially circular path such that said substantially circular relativistic electron beam and said optical field are spatially contiguous in a resonant condition for free electron laser operation.

The advantages of the present invention are that efficient conversion of the acceleration energy to optical field energy is readily achievable since the electrons are accelerated within the wiggler. Although prior art systems have presented concepts for avoiding the loss of discarded electrons such as the use of the storage ring, the present invention avoids problems of energy spread introduced into the beam by the wiggler without requiring an extremely precise isochronous transport system. Also, the circular geometry of the present invention provides a relatively compact device which is capable of producing a high power output laser beam with high overall system efficiency.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

PREFERRED EMBODIMENT OF THE INVENTION

Figure 2:
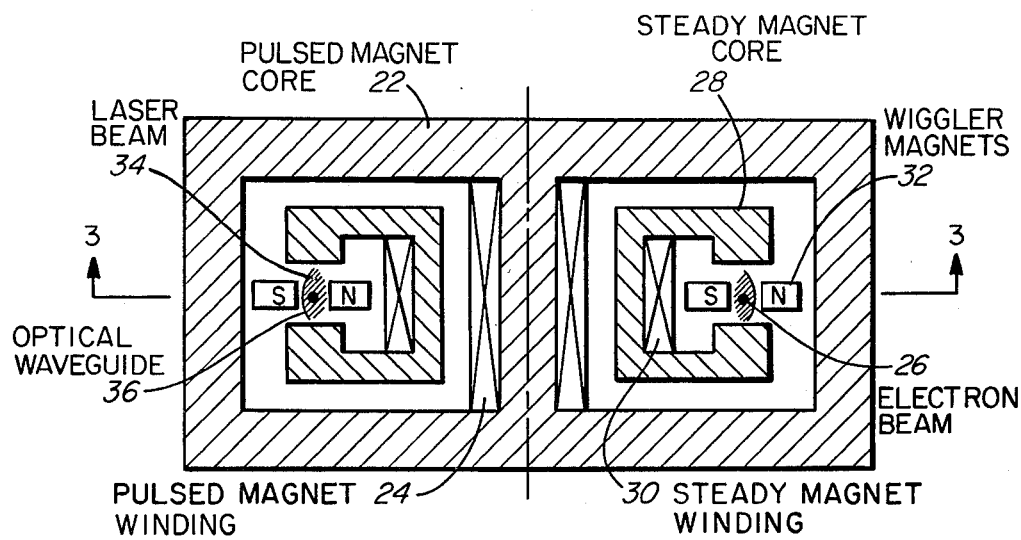
FIG. 2 is a side view of the present invention incorporated in a betatron.
Figure 3:
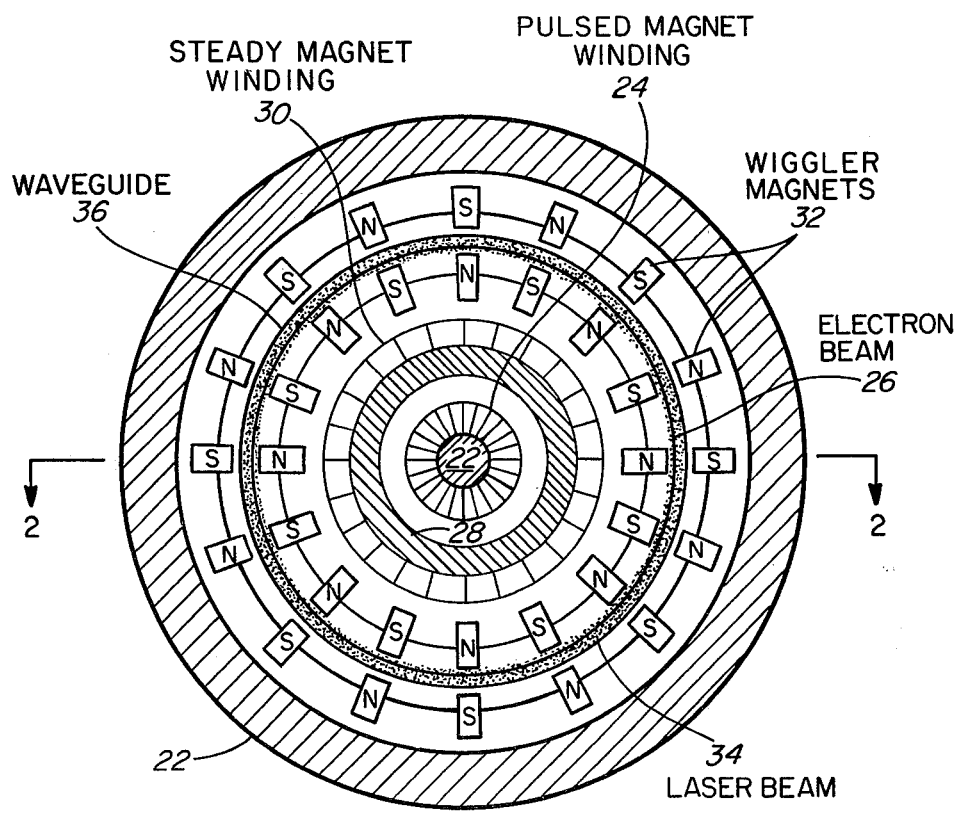
FIG. 3 is a top view of the present invention incorporated in a betatron.

The present invention describes a new configuration for a free electron laser that provides for operation at very high efficiency. Basically, the device of the present invention makes use of a circular optical resonator, based on waveguide principles, which constrains a laser beam generated in the device to follow a circular path, with an electron beam following the same path. Consequently, the optical energy and the electrons of the circular relativistic electron beam are spatially contiguous. The device of the present invention may be incorporated with a time-dependent magnetic field, such as produced in a betatron as illustrated in FIGS. 2 and 3, or with a curved traveling wave or standing wave rf accelerator, such as illustrated in FIG. 1.

As is well known in free electron laser theory, a sufficiently intense laser field will trap relativistic electrons in "buckets" of a ponderomotive field formed by the wiggler and optical fields. These buckets move parallel to the laser field at the resonant velocity, i.e., the light wave moves ahead one wavelength as the electron executes one oscillation in the transverse direction. The corresponding resonant energy $\gamma_r$ is given by the approximate formula $$\gamma_r^2 \approx \lambda_W[1+(eB\lambda_W/2\pi mc)^2]/2\lambda_L, \qquad (1)$$

where $\lambda_L$ is the laser wavelength, $\lambda_W$ the wiggler period, e the electron charge, B the rms magnetic induction, m the electron mass, and c the velocity of light. Electrons in a bucket which are moving faster than the resonant velocity will be slowed down to the bucket velocity, and the energy these electrons lose will be given up to the optical field. This comprises the standard mechanism for amplification in free electron lasers. Similarly, electrons moving slower than the resonant velocity are accelerated at the expense of the optical field, causing absorption. When an acceleration field is applied to the electrons in a bucket, these electrons will initially move forward in the bucket, but the velocity of these electrons is constrained by the ponderomotive field. Further work done on the electrons by the acceleration field will be transformed directly into optical field energy so as to amplify the optical field. In the circular free electron laser configuration of the present invention, this process continues uninterrrupted leading to very efficient conversion of energy from the acceleration field to the optical field. This efficient conversion primarily results from the fact that the electrons are never released from the ponderomotive field in the device of the present invention. The optical field of the free electron laser of the present invention is made spatially contiguous with the circular relativistic electron beam by the use of a circular whispering mode optical waveguide for guiding the optical energy in a circular path in the circular relativistic electron beam accelerator.

Figure 1:
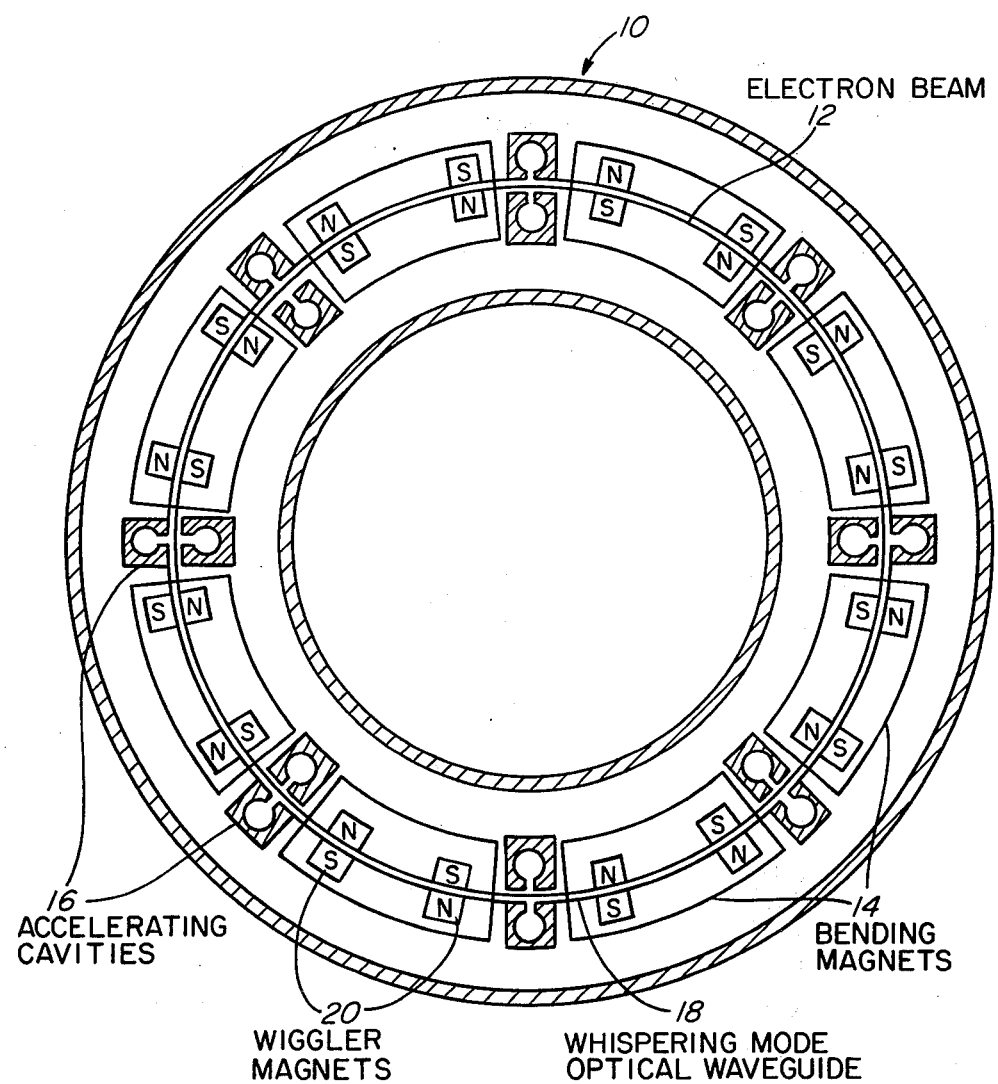
FIG. 1 is a schematic diagram of the present invention incorporated in an electron synchrotron.

FIG. 1 discloses an embodiment of the present invention utilizing an electron synchrotron 10. As illustrated in FIG. 1, an electron beam 12 is generated in the synchrotron 10. A series of bending magnets 14 direct the electron beam 12 in a circular path around the synchrotron 10. Accelerating cavities 16 provide an acceleration field to maintain the electron beam 12 at relativistic energies. The electron beam 12 is initially inserted into synchrotron 10 by an electron beam source (not shown). A whispering mode optical waveguide 18 is provided in the synchrotron free electron laser for guiding the optical field in a circular path so that the circular relativistic electron beam and the optical energy are spatially contiguous in a resonant condition for free electron laser operation. The whispering mode optical waveguide 18 is a circular waveguide which is described in more detail below. A transverse wiggler field is provided by wiggler magnets 20. Wiggler magnets 20 produce a substantially conventional magneto-static field. To amplify the optical polarization parallel to the wall of whispering mode optical waveguide 18, the magnetic field must be oriented radially as illustrated in FIG. 1. In addition to being necessary for laser gain, the wiggler field is useful in two other ways. First, the wiggler field enhances the synchrotron radiation which damps the motion of the electron beam. Second, the wiggler field provides a radial focussing field that reduces the spatial extent of the electron beam in the radial direction. For a laser wavelength of 10 $\mu$m, an electron energy of $\approx$100 MeV ($\gamma_r \approx$ 200), and a magnetic induction of 0.3 T, the wiggler period predicted by Eq. 1 is 10 cm. For an emittance $\epsilon$ approximately equal to $10^{-2}$ mm-mrad, the radial spot size in the absence of any other focussing is calculated to be 0.22 mm.

To avoid dislodging the electrons of the electron beam from the optical buckets, it is necessary to accelerate these electrons gently around part or all of the circle. This is readily achieved in the synchrotron free electron laser illustrated in FIG. 1. It should be noted that the synchrotron free electron laser illustrated in FIG. 1 can comprise a curved traveling wave type accelerator for either pulsed or cw operation or a standing wave synchrotron free electron laser. Of course, in such accelerator configurations, not all of the electrons are trapped in the ponderomotive buckets, and some become detrapped. These electrons are accelerated to higher energy and can be sorted out and removed from the system.

The present invention may also be implemented in a pulse device with a time-dependent magnetic field such as the betatron illustrated in FIGS. 2 and 3. The betatron of FIGS. 2 and 3 is similar to a conventional betatron. A pulsed magnet core 22 is provided which is driven by a pulsed magnet winding 24. This provides a flux through the central portion of the pulsed magnet core to establish and drive the electron beam 26 of the betatron. Similarly, a steady magnet core 28 is driven by a steady magnet winding 30, which provides for transport of electron beam 26. A steady magnetic field is provided by steady magnet core 28 and steady magnet winding 30 since once the e-beam is generated it has a steady energy. Wiggler magnets 32 provide a uniform radially disposed magnetic field such as illustrated in FIG. 3. The laser beam 34 generated in the betatron free electron laser device illustrated in FIGS. 2 and 3 is guided in a circular path around the betatron by a circular whispering mode optical waveguide 36 so that the electron beam 26 and the laser beam 34 are spatially contiguous in a resonant condition for free electron laser operation.

Bent metallic waveguides have been disclosed by E. Garmire, T. McMahon, and M. Bass, Appl. Opt. 15, 145 (1976); Appl. Phys. Lett. 29, 254 (1976), 31, 92 (1977), 34, 35 (1979); IEEE J. Quant. Electron. QE-16, 23 (1980). As disclosed by Norman A. Kurnit in U.S. patent application Ser. No. 271,061, filed June 8, 1981 entitled "Raman Scattering in a Whispering Mode Optical Waveguide" and now U.S. Pat. No. 4,338,570 and in U.S. patent application Ser. No. 291,885, filed Aug. 11, 1981 entitled "Optical Pumping in a Whispering Mode Optical Waveguide," low loss propagation of laser beams through long path lengths in compact arrangements can be achieved. When the radius of the bend is small enough, the wave propagates along the waveguide by successive reflections off the outer wall. Since the wave does not contact the inner wall, the inner wall may be removed. Similar structures using curved dielectric surfaces have been proposed for use in integrated optics applications, such as disclosed by S. Sheem and J. R. Whinnery, Wave Electronics 1, 61, 105 (1974); E. A. J. Marcatili, Bell Syst. Tech. J. 48, 2103 (1969). Transverse guiding of the wave is achieved in the present invention by adding a slight curvature to the guiding surface as disclosed in the above referenced U.S. patent applications. The guiding properties of such toroidal surfaces have been studied for the purpose of producing flexible metallic waveguides as disclosed by M. E. Marhic, L. I. Kwan, and M. Epstein, Appl. Phys. Lett. 33, 609 (1978); 33, 874 (1978), and L. W. Casperson and T. S. Garfield, IEEE J. Quantum Electron. QE-15, 491 (1979). Incorporation of small sections of such waveguides inside a laser cavity has been disclosed by M. E. Marhic, L. I. Kwan, and M. Epstein, IEEE J. Quantum Electron. QE-15, 487 (1979).

Figure 4:
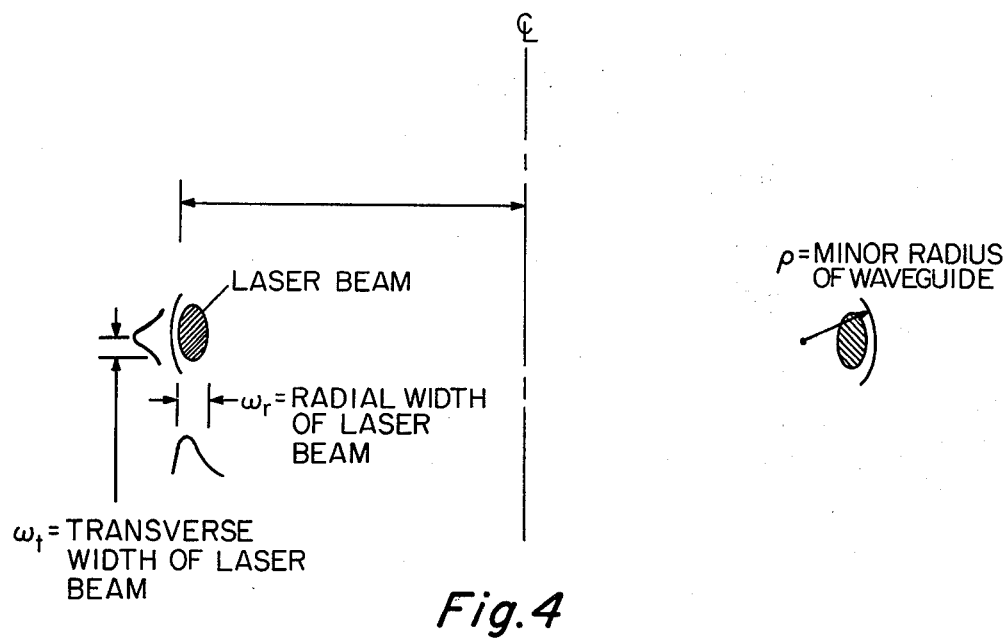
FIG. 4 is a schematic diagram of the whispering mode optical waveguide and the optical intensities achieved by such a device.

When the bent metallic waveguide is brought around to form a circle, as illustrated in both FIG. 1 and FIG. 3 of the present invention, the optical modes of the system are similar to the acoustical "whispering gallery" modes investigated by Lord Rayleigh as disclosed in Phil. Mag. 20, 1001 (1910), (Scientific Papers, Camb. Univ. Press, Vol. 5, p. 617). The intensity distribution near the wall of the waveguide is shown schematically in FIG. 4. The width $\omega_r$ of the radial intensity distribution is roughly $$\omega_r \approx \tfrac{1}{2}[3/2(n-\tfrac{1}{2})]^{\frac{2}{3}}(\lambda_L^2 R)^{\frac{1}{3}} \tag{2}$$

where R is the radius of the bend in the waveguide and $n = 1, 2, \ldots$ is the mode number, such as disclosed by K. G. Budden, *The Wave-Guide Mode Theory of Wave Propagation*, London, Logos, 1961, p. 181. For a 10 μm laser with a waveguide radius of 10 m, this expression gives an optical beam width of 0.54 mm for $n=1$ and 0.95 mm for $n=2$. The beam waist in the transverse direction is given by $$\omega_t = \left( \frac{\lambda_L}{\pi} \sqrt{\rho R} \right)^{\frac{1}{2}}, \tag{3}$$

where $\rho$ is the radius of curvature imposed upon the guide cross-section as disclosed by M. E. Marhic, L. I. Kwan, and M. Epstein, Appl. Phys. Lett. 33, 609 (1978); 33, 874 (1978). For $\rho = 1$ m and the other parameters given above, $\omega_t = 3.2$ mm. For metallic waveguides, the lowest loss occurs when the optical wave is polarized with the electric field parallel to the surface of the waveguide. For glancing-incidence propagations, the loss depends only upon the angle through which the beam is bent, not on the radius of the bend and for sufficiently large $\rho$ is not appreciably increased by the guide curvature. Low losses of a few percent per revolution have been predicted and observed, such as disclosed in Los Alamos National Laboratory, AP-2 Quarterly Progress Report, AP-2-80:287, Section II A, and N. A. Kurnit, LA-UR-81-994, Los Alamos Conference on Optics, Apr. 7–10, 1981, Paper Blll, to be published in SPIE proceedings.

Figure 5:
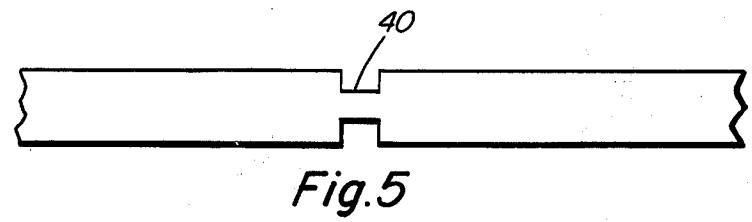
FIG. 5 is a schematic diagram of the whispering mode optical waveguide illustrating one manner of output coupling of laser energy.

FIG. 5 schematically illustrates a section of a whispering mode optical waveguide which can be used for output coupling of the laser beam produced in the device of the present invention. As illustrated in FIG. 5, optical radiation is emitted from the narrower portion 40 of the optical waveguide.

Figure 6:
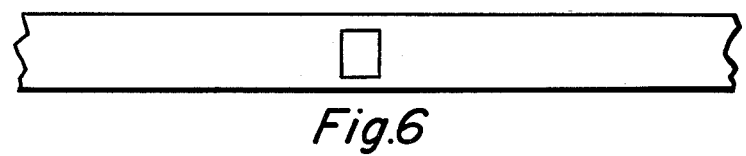
FIG. 6 is a schematic diagram of the whispering mode optical waveguide illustrating another manner of output coupling of optical energy.
Figure 7:
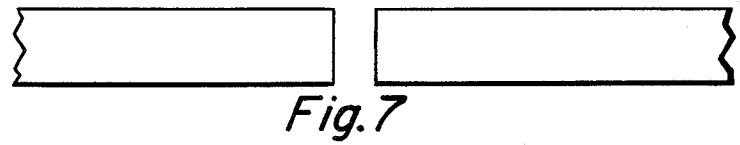
FIG. 7 is a schematic diagram of the whispering mode optical waveguide illustrating another manner of output coupling of optical energy.

FIGS. 6 and 7 illustrate alternative embodiments for output coupling of optical energy. In both the configurations of FIGS. 6 and 7, the manner in which the optical beam is reflected from the whispering mode optical waveguide can be changed as well as the size and configuration of the hole and slot illustrated in FIGS. 6 and 7 so that multiple revolutions of the optical beam will occur before optical radiation is emitted from the waveguide. The slotted configuration of FIG. 7 is particularly useful since it allows the increasing magnetic field of the betatron to expand, and allows for accelerating gaps in synchrotrons. Additionally, it should be noted that partially reflective surfaces can also be inserted within the waveguide to permit output coupling of optical energy in the manner of a conventional laser device. Alternatively, a diffraction grating etched or scribed on part of the surface can be used to couple out a fraction of the circulating energy.

Consequently, the present invention provides a device which allows for efficient conversion of rf acceleration field energy directly to laser optical field energy in a high power, high efficiency free electron laser configuration. This conversion is accomplished by causing the electrons to be accelerated in a circular relativistic electron beam accelerator so that they are never released from the ponderomotive field generated by a spatially contiguous optical beam and wiggler field which is disposed around the entire circumference of the circular relativistic electron beam accelerator. The present invention also avoids the problems associated with precise isochronous transport systems and losses occurring from conversion from rf field energy to electron beam energy and vice versa. The present invention can be implemented in both a synchrotron and a betatron to establish a circular relativistic electron beam. The present invention also provides a compact device which is capable of producing high output powers with high efficiency.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, various rf waveguide structures can be used in the present invention such as disk loaded waveguides to provide a phase velocity of the acceleration field which is equal to the electron beam velocity. Additionally, it is also possible that higher order optical modes can be used with the whispering mode optical waveguide such that greater spatial separation of the electron beam from the optical waveguide can be provided. Consequently, the embodiment disclosed was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A high power, high efficiency free electron laser comprising:
    circular relativistic electron beam accelerator means for producing a circular relativistic electron beam;
    free electron laser wiggler means disposed in said circular relativistic electron beam accelerator for generating a periodic magnetic field to transform energy from said circular relativistic electron beam to optical energy;
    circular whispering mode optical waveguide means for guiding said optical energy in a circular path in said circular relativistic electron beam accelerator such that said circular relativistic electron beam and said optical energy are spatially contiguous in a resonant condition for free electron laser operation.

2. The laser of claim 1 wherein said circular relativistic electron beam accelerator comprises a betatron.

3. The laser of claim 1 wherein said circular relativistic electron beam accelerator comprises an electron synchrotron.

4. The laser of claim 3 wherein said electron synchrotron comprises a traveling wave accelerator.

5. The laser of claim 3 wherein said electron synchrotron comprises a standing wave accelerator.

6. The laser of claim 1 wherein said circular relativistic electron beam accelerator comprises a curved traveling wave accelerator.

7. A circular free electron laser having high efficiency comprising:
    means for generating a substantially circular relativistic electron beam;
    means for producing an acceleration field;
    free electron laser wiggler means disposed around said circular relativistic electron beam for producing a periodic magnetic field such that an optical field is generated in response to the transformation of energy from said acceleration field to said optical field;
    whispering mode optical waveguide means disposed to guide said optical field in a substantially circular path such that said substantially circular relativistic electron beam and said optical field are spatially contiguous in a resonant condition for free electron laser operation.

8. The laser of claim 7 wherein said means for generating a substantially circular relativistic electron beam comprises a betatron.

9. The laser of claim 7 wherein said means for generating a substantially circular relativistic electron beam comprises an electron synchrotron.

10. The laser of claim 9 wherein said electron synchrotron comprises a traveling wave accelerator.

11. The laser of claim 9 wherein said electron synchrotron comprises a standing wave accelerator.

12. The laser of claim 7 wherein said means for generating a substantially circular relativistic electron beam comprises a traveling wave accelerator.

* * * * *